United States Patent [19]

Russell

[11] Patent Number: 4,625,649
[45] Date of Patent: Dec. 2, 1986

[54] PROJECTILES

[75] Inventor: James L. L. Russell, Stevenage, United Kingdom

[73] Assignee: British Aerospace PLC, Surrey, England

[21] Appl. No.: 596,493

[22] Filed: Apr. 4, 1984

[30] Foreign Application Priority Data

Apr. 5, 1983 [GB] United Kingdom ............... 8308960

[51] Int. Cl.$^4$ ............................................. F42B 15/10
[52] U.S. Cl. ................................................. 102/377
[58] Field of Search .................... 102/377, 378; 60/225

[56] References Cited

U.S. PATENT DOCUMENTS

| 3,368,486 | 2/1968 | Webb ................................. 102/378 |
| 3,760,730 | 9/1973 | Osborne et al. ..................... 102/377 |

FOREIGN PATENT DOCUMENTS

| 1228344 | 4/1971 | United Kingdom . |
| 1245969 | 9/1971 | United Kingdom . |
| 1319805 | 6/1973 | United Kingdom . |
| 1408661 | 10/1975 | United Kingdom . |
| 1440753 | 6/1976 | United Kingdom . |

OTHER PUBLICATIONS

Young et al, "An Analysis of the Coning Motions of the Final Stages of Three NASA Scout Development Vehicles," NASA, 1962.

Primary Examiner—Deborah L. Kyle
Assistant Examiner—Ted L. Parr
Attorney, Agent, or Firm—Cushman, Darby & Cushman

[57] ABSTRACT

A projectile includes forward and rearward stage motors 12 and 10 respectively, and a boost separation device 11 releasably connecting the two together. The boost separation device includes an impingement plate 17 slidably mounted on the rearward stage motor 10, and a cruciform shaped locking strip element 20 is secured to the deflector plate. The free ends of the arms 21 of the element 20 are received in a groove 27 provided in a rearward portion of the casing of the forward motor. On ignition of the forward motor, its propulsion gases drive plate 17 rearwardly, thus drawing the ends of arms 21 out of the groove 27, thus to allow separation of the rearward stage motor.

6 Claims, 3 Drawing Figures

PROJECTILES

This invention relates to projectiles and in particular, though not exclusively, to means for allowing the separation of the constituent rocket motor stages in flight.

Projectiles having staged rocket motors are known which include a primary motor stage arranged behind a secondary motor stage and in which the primary motor stage is jettisoned during flight prior to firing of the secondary motor. Conventional arrangements achieve this result by means of explosive bolts releasably holding the primary and secondary stages together or by means of a line cutting charge provided on the periphery of the wall between the primary and secondary stages. These devices require electrical connections and circuitry together with pyrotechnics which may have adverse effects on safety and reliability.

According to one aspect of this invention, there is provided a projectile including a first section having propulsion means operable to exhaust propulsion fluid from an end region thereof, a second section arranged adjacent said end region, releasable attachment means attaching said first and second sections together, said attachment means including impingement surface means coupled to mechanical locking means movable between a locking position and a release position, the releasable attachment means being arranged so that on operation of said propulsion means, said impingement surface means is displaced thereby moving said locking means to its release position and allowing separation of said first and second sections.

The mechanical locking means preferably comprises strip means generally transversely with respect to the second section and engageable with an abutment surface provided on the first section. Preferably, said impingement surface region is in the form of a deflector plate slidably movable with respect to said second section.

The impingement surface region is preferably in the form of the crown portion of a piston slidably mounted in a bore provided in said second section.

Preferably, the impingement surface means are frusto-conical form and port means are provided transversely of the impingement surface means, whereby propulsion fluid generated by said propulsion means is deflected to exhaust through said ports.

Conveniently, said strip means are of generally cruciform shape, and location means are provided to prevent movement of the strip in a longitudinal direction, but to allow movement of the end regions of the strip in a radial sense.

According to another aspect of this invention, there is provided a separation device for effecting in-flight separation of adjacent stage motors of a projectile comprising a body portion for secure attachment at one end to a first stage motor of a projectile and for releasable attachment at its other end to the aft portion of an adjacent stage motor of the projectile, said body portion including impingement surface means slidably mounted therein, mechanical locking means coupled to said impingement surface means and co-operable with associated abutment means provided on said adjacent stage motor, said mechanical locking means being movable between a locking position and a release position, the device being arranged so that on operation of said adjacent stage motor, the impingement surface means is displaced thereby moving said locking means from its locking position to its release position.

In this specification "forward" and "rearward" relate to the direction of travel of the projectile, and the term "projectile" is intended to include missiles, mortars, as well as launch vehicles for launching personnel and/or equipment into space.

By way of example only, one specific embodiment of this invention will now be described in detail, reference being made to the accompanying drawings in which.

Figure 1:
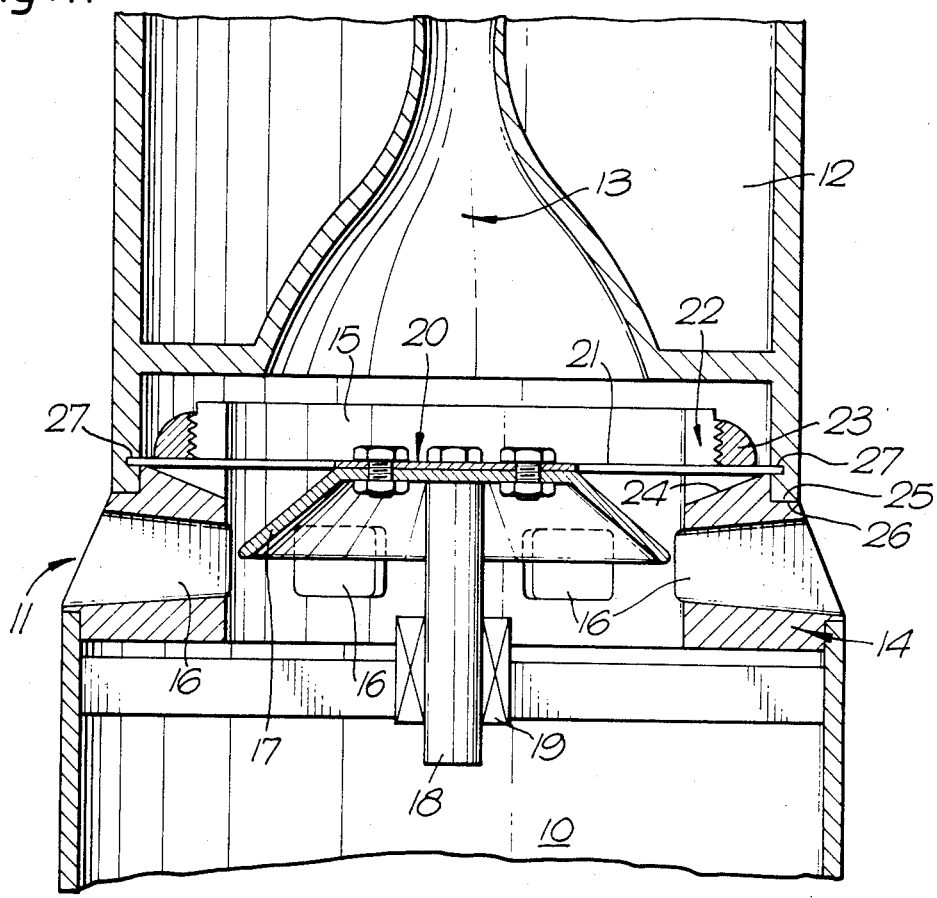
FIG. 1 is a longitudinal sectional view of the adjacent end regions of the forward and rearward sections of a first embodiment of projectile of this invention.
Figure 2:
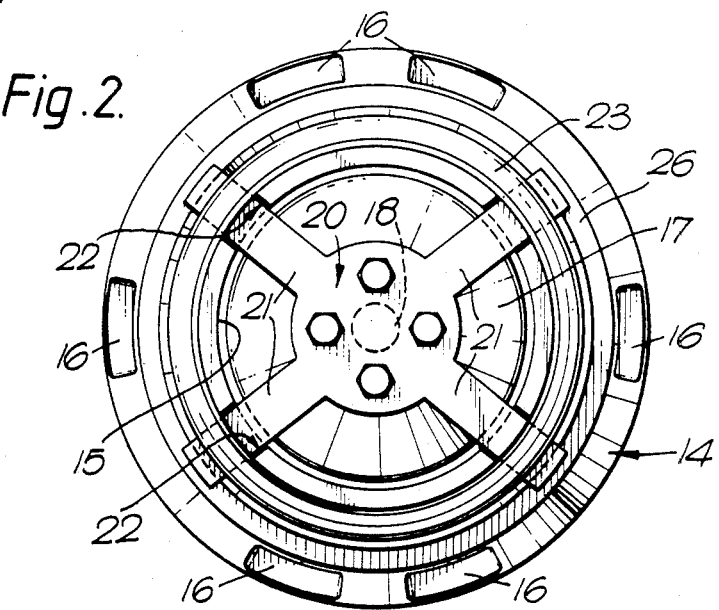
FIG. 2 is an end view of the rearward section of the projectile of FIG. 1.

Referring to FIGS. 1 and 2, the first embodiment of projectile includes a rearward section 10 provided at its forward end with a boost separator mechanism shown generally at 11 which releasably attaches the rearward section 10 to a forward section 12 having an outlet arrangement 13 for exhausting propulsive fluid generated by a propulsion means (not shown). The boost separator mechanism comprises a ring shaped member 14 secured to the forward end region of the rearward section 10 having a bore 15 and a plurality of transverse ports 16 communicating therewith. A deflector plate 17 is mounted for longitudinal sliding movement by means of rod 18 and bearing assembly 19 and is received with clearance in bore 15. The plate 17 is generally frusto-conical in form and has secured to its upper surface by means of bolts a cruciform shaped locking member 20 formed of a strip-steel type of material (FIG. 2). The arms 21 of locking member 20 each pass through a respective radial channel 22 cut in ring-shaped member 14 and are constrained against longitudinal movement by means of an internally threaded retaining ring 23 which is threadedly engaged with a corresponding externally threaded portion on ring-shaped member 14, the ring 23 however allowing radial movement of the ends of the arms 21 of the locking member 20 on longitudinal displacement of deflector plate 17. The radial channels 22 are bevelled as shown at 24 to assist such radial movement.

The forward section is provided with a rearward end region having an abutment surface 25 which abuts a corresponding surface 26 on ring-shaped member when the forward and rearward sections are attached and an internal groove 27 in which are received the free ends of the arms 21 of the locking member when the deflector plate is in an equilibrium position (as viewed in FIGS. 1 and 2) to lock the forward and rearward sections together.

In use, the projectile is launched and initially is propelled by means of a rocket propulsion means contained within the rearward section. When the rocket propulsion means has exhausted all or nearly all of its fuel, or when for any other reason it is wished to jettison the rearward section, the propulsion means of the forward section is actuated. This causes propulsion fluid to issue through outlet arrangement and to impinge on the upper surface of deflector plate 17 to cause it to be deflected longitudinally away from the forward section. The fluid, after impinging on deflector plate 17, exhausts through transverse ports 16; the transverse ports are dimensioned so that their effective outlet area is always greater than the throat area of outlet arrangement to prevent choking of the flow of propulsive fluid. On displacement of the deflector plate 17, the ends of the arms 21 of the locking member 20 are drawn radially inwards as the cruciform member bows, thereby disengaging them from groove 27 and allowing the rearward section 10 to be separated from the forward section under the continued flow of propulsion fluid from the forward section.

Under normal launch and flight conditions, the bulk of the forces acting are sustained in the outer casings of the forward and rearward sections which are contiguous via abutment surfaces 25 and 26 until the sections are separated.

The use of a cruciform-strip member gives a simple and effective separation mechanism; however, the single strip member may be replaced by a series of links coupling the deflector plate to respective locking bolts for certain applications.

Figure 3:
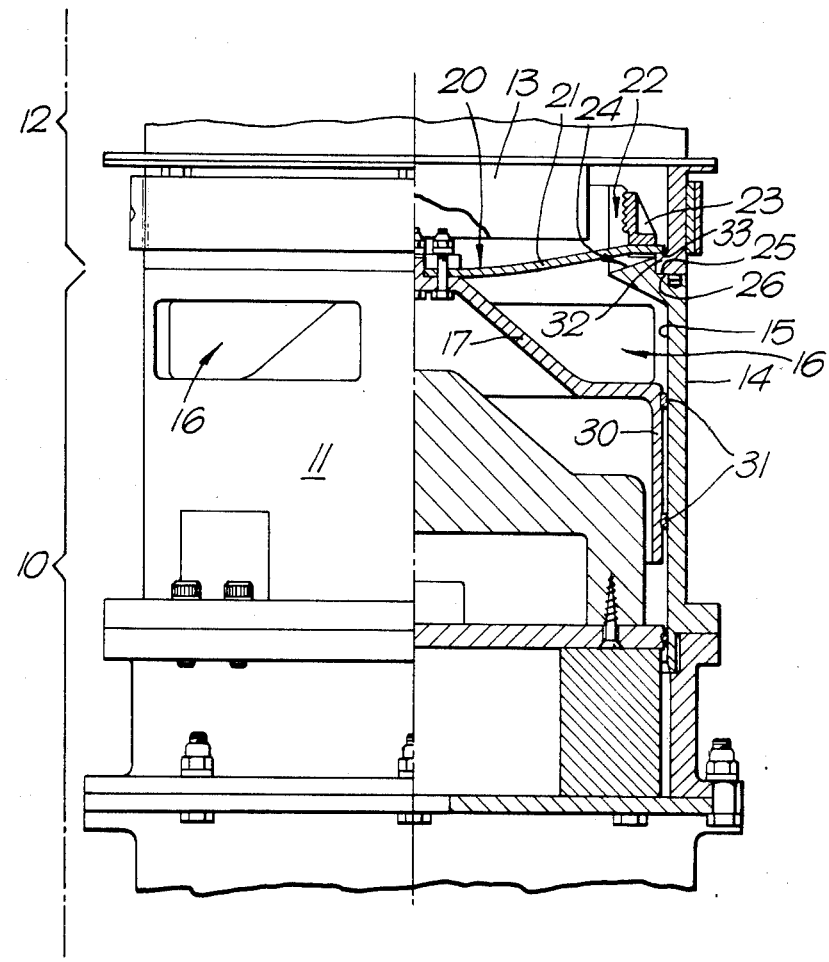
FIG. 3 is a side view, partly in section of the mid portion of a second embodiment of projectile of this invention, illustrating a boost separation device.

Referring now to FIG. 3, the second embodiment illustrated is in some respects similar to that of the embodiment of FIGS. 1 and 2 and similar items will be given similar reference numerals.

In this embodiment, the boost separation mechanism 111 is secured to the forward end of the rearward section 110 of the projectile and releasably attached to the forward section 112 of the projectile, as in the previous embodiment. The mechanism 111 includes a cylindrical member 114 having an internal bore 115 and spaced peripheral ports 116. The deflector plate 117 is of frusto-conical form and forms the crown portion of a piston 130 slidably received in the bore 115 by rings 131 of P.T.F.E. material. This form of mounting prevents movement of the plate in the transverse direction and thus is useful in combatting the effect of side loads when the mechanism is used in a projectile which is launched vertically and subsequently travels horizontally.

In addition, the cruciform locking member 120 is bowed as shown in the Figure when in its equilibrium position, and this provides a spring effect, which is found to improve operation of the mechanism.

The rearward end region of the forward section 112 is formed with an annular lip 132 which defines on one side an abutment surface 125 for engagement with the associated abutment surface 126 provided on the rearward section and on its other side a latch surface 133 for engagement by the end regions of arms 121 of the locking member 120.

I claim:

1. A projectile having a forward portion including propulsion means having outlet means for exhausting efflux rearwardly, a rearward portion arranged adjacent said forward portion; releasable connection means for connecting said rearward portion to said forward portion, said connection means comprising an impingement member attached to said rearward portion for axial sliding movement and having an impingement region facing said outlet means and strip means connected to said impingement member and having a plurality of locking portions for engaging abutment means on said forward portion to lock together said forward and rearward portions, and radial outlet means on said rearward portion disposed adjacent said impingement member so that the latter deflects said efflux through said outlet means, the connection means being arranged such that on operation of said propulsion means said impingement member is moved rearwardly relative to said rearward portion thus to withdraw said locking portions from engagement.

2. A projectile according to claim 1 wherein said impingement member is in the form of a deflector plate.

3. A projectile according to claim 1 wherein the impingement member is in the form of the crown portion of a piston, said piston being slidably received in a bore provided in the rearward portion.

4. A projectile according to claim 1 wherein the impingement member is of frusto-conical form, whereby propulsion fluid generated by said propulsion means is deflected to exhaust through said radial outlet means.

5. A projectile according to claim 1 wherein said strip means are of generally cruciform shape, and location means are provided to prevent movement of the locking portions of the strip in a longitudinal direction but to allow movement thereof in a radial sense.

6. A separation device for effecting in flight separation of adjacent stage motors of a projectile comprising a body portion for secure attachment at one end to a first stage motor of a projectile and for releasable attachment at its other end to the rearward portion of an adjacent stage motor of the projectile, said body portion including an impingement member slidably mounted therein, strip means connected to said impingement member and having a plurality of locking portions for engaging abutment means on said adjacent stage motor for locking together said first stage motor and said adjacent stage motor, said impingement member being movable to a release position in which said locking portions are withdrawn from engagement from said abutment means, the device being arranged so that on operation of said adjacent stage motor the efflux therefrom moves the impingement member to its release position, and including radial outlet means on said body portion adjacent the impingement member so that the later deflects the efflux from the adjacent stage motor through the radial outlet means.

* * * * *